US009743451B2

(12) United States Patent
Lopes et al.

(10) Patent No.: US 9,743,451 B2
(45) Date of Patent: Aug. 22, 2017

(54) INTEGRATED COMMUNICATION NETWORK FOR A NETWORK OF MOVING THINGS

(71) Applicant: Veniam, Inc., Mountain View, CA (US)

(72) Inventors: Diogo Lopes, Aveiro (PT); Filipe Neves, Agueda (PT); Andre Cardote, Aveiro (PT); Ricardo de Matos, Porto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/132,867

(22) Filed: Apr. 19, 2016

(65) Prior Publication Data

US 2017/0086241 A1    Mar. 23, 2017

Related U.S. Application Data

(60) Provisional application No. 62/221,997, filed on Sep. 22, 2015.

(51) Int. Cl.
| | |
|---|---|
| *H04W 4/00* | (2009.01) |
| *H04W 76/02* | (2009.01) |
| *H04L 12/46* | (2006.01) |
| *H04W 48/20* | (2009.01) |

(52) U.S. Cl.
CPC ....... *H04W 76/025* (2013.01); *H04L 12/4641* (2013.01); *H04W 48/20* (2013.01)

(58) Field of Classification Search
CPC ... H04W 76/025; H04W 48/20; H04W 28/10; H04W 36/00; H04W 84/20; H04W 88/08; H04W 76/022; H04W 88/02; H04W 16/00; H04W 28/08; H04W 40/248; H04W 4/04; H04W 4/046; H04W 4/005; H04L 12/4641; H04L 12/4633; H04L 41/0886; H04L 41/0806; H04L 41/0813; H04L 41/0889; H04L 41/0876; H04L 67/12; H04L 29/08558; H04L 2209/84
See application file for complete search history.

(56) References Cited

U.S. PATENT DOCUMENTS

| | | | | |
|---|---|---|---|---|
| 8,194,680 B1 * | 6/2012 | Brandwine | ........... | H04L 61/103 370/398 |
| 8,943,167 B2 * | 1/2015 | Aurongzeb | ......... | H04L 29/0872 709/217 |
| 8,989,053 B1 * | 3/2015 | Skaaksrud | ............ | H04W 12/06 370/255 |

(Continued)

OTHER PUBLICATIONS

Int'l Search Report and Written Opinion for PCT/US2016/052597 dated Oct. 21, 2016 (15 pages).

*Primary Examiner* — Charles C Jiang
*Assistant Examiner* — Rose Clark
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for integrating and/or integrating with a communication network comprising a complex array of both static and moving communication nodes (e.g., the Internet of moving things).

19 Claims, 13 Drawing Sheets

(56) References Cited

U.S. PATENT DOCUMENTS

| | | | | |
|---|---|---|---|---|
| 9,154,900 B1* | 10/2015 | Addepalli | | H04W 4/046 |
| 2007/0206537 A1* | 9/2007 | Cam-Winget | | H04L 63/162 |
| | | | | 370/331 |
| 2015/0052255 A1* | 2/2015 | Sun | | H04L 49/253 |
| | | | | 709/227 |
| 2015/0078167 A1* | 3/2015 | Papa | | H04W 28/10 |
| | | | | 370/235 |
| 2015/0288443 A1* | 10/2015 | Foxworthy | | H04B 7/18582 |
| | | | | 370/316 |
| 2015/0350946 A1* | 12/2015 | Das | | G01S 5/14 |
| | | | | 455/41.2 |
| 2016/0119054 A1* | 4/2016 | Foxworthy | | H04B 7/18582 |
| | | | | 370/319 |

* cited by examiner

900

```
{
    "client": "New York Bus",
    "mc":{
        "10":{
            "public":{
                "vlan_id": 701,
                "ip": "device_ip",
                "netmask": "255.255.255.248",
                "gateway": "gw_ip",
                "dns_servers": "dns_servers_list",
                "ports_range": "0:0"
            },
            "local":{
                "vlan_id": 0,
                "ip": "device_ip",
                "netmask": "255.255.255.0",
                "gateway": "gw_ip",
                "dns_servers": "dns_servers_list"
            }
        },
        "11":{
            "public":{
                "vlan_id": 701,
                "ip": "device_ip",
                "netmask": "255.255.255.248",
                "gateway": "gw_ip",
                "dns_servers": "dns_servers_list",
                "ports_range": "1201:1210"
            },
            "local":{
                "vlan_id": 0,
                "ip": "device_ip",
                "netmask": "255.255.255.0",
                "gateway": "gw_ip",
                "dns_servers": "dns_servers_list"
            }
        },
        "12":{
            "public":{
                "vlan_id": 701,
                "ip": "device_ip",
                "netmask": "255.255.255.248",
                "gateway": "gw_ip",
                "dns_servers": "dns_servers_list",
                "ports_range": "1211:1220"
            },
            "local":{
                "vlan_id": 300,
                "ip": "device_ip",
                "netmask": "255.255.255.0",
                "gateway": "gw_ip",
                "dns_servers": "dns_servers_list"
            }
        }
    },
```

```
"network":{
        "infrastructure_connection": "vlan_id",
        "control_vlan_id_has_dhcp": true/false,
        - or
        "infrastructure_connection": "vpn",
        - or
        "infrastructure_connection": "mix",
        "control_vlan_id_has_dhcp": true/false, "SNMP_enabled": true/false
},
 "cellular":{
"obus_have_public_ips": true/false,
},
 "wifi":{
"channel": 2,
-or
"channel": 0,          // means random channel
        ssid_auth":[
            {
              "ssid":"NetA"
              "authentication": "public_captive"
            },
            {
              "ssid":"NetB",
              "authentication": "private_captive",
              "vlan_id": 563
            },
            {
              "ssid":"NetC"
              "authentication": "radius_mvlan_id"
              "radius_ip": "192.168.205.121",
              "radius_secret": "nlFLnlfklfnnLNlJLN266fFe"
            },
            {
              "ssid":"NetD"
              "authentication": "radius_svlan_id"
              "vlan_id": 655,
              "radius_ip": "192.168.205.19",
              "radius_secret": "LNBjhBHJvVGvBK15kjbKJBjB"
            },
            {
              "ssid":"NetE"
              "authentication": "radius"
              "radius_ip": "192.168.205.121",
              "radius_secret": "nlFLnlfklfnnLNlJLN266fFe"
            }
        ]
    }
}
```

Figure 9B

INTEGRATED COMMUNICATION NETWORK FOR A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/221,997, filed on Sep. 22, 2015, and titled "Integrated Communication Network for a Network of Moving Things," U.S. Provisional Patent Application No. 62/222,192, filed Sep. 22, 2015, and titled "Communication Network of Moving Things," and U.S. Provisional Patent Application Ser. No. 62/299,269, filed on Feb. 24, 2016, and titled "Systems and Methods for Automating and Easing the Installation and Setup of the Infrastructure Supporting a Network of Moving Things," each of which is hereby incorporated herein by reference in its respective entirety. The present application is also related to U.S. patent application Ser. No. 15/066,168, titled "Communication Network of Moving Things," filed on Mar. 10, 2016, which is hereby incorporated herein by reference in its entirety for all purposes.

BACKGROUND

Current communication networks are unable to adequately support communication environments involving mobile and static nodes. As a non-limiting example, current communication networks are unable to adequately support integrating and/or integrating with a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIGS. 9A and 9B illustrate an example Master Configuration File (MCF), in accordance with various aspects of the present disclosure.

SUMMARY

Figure 1:
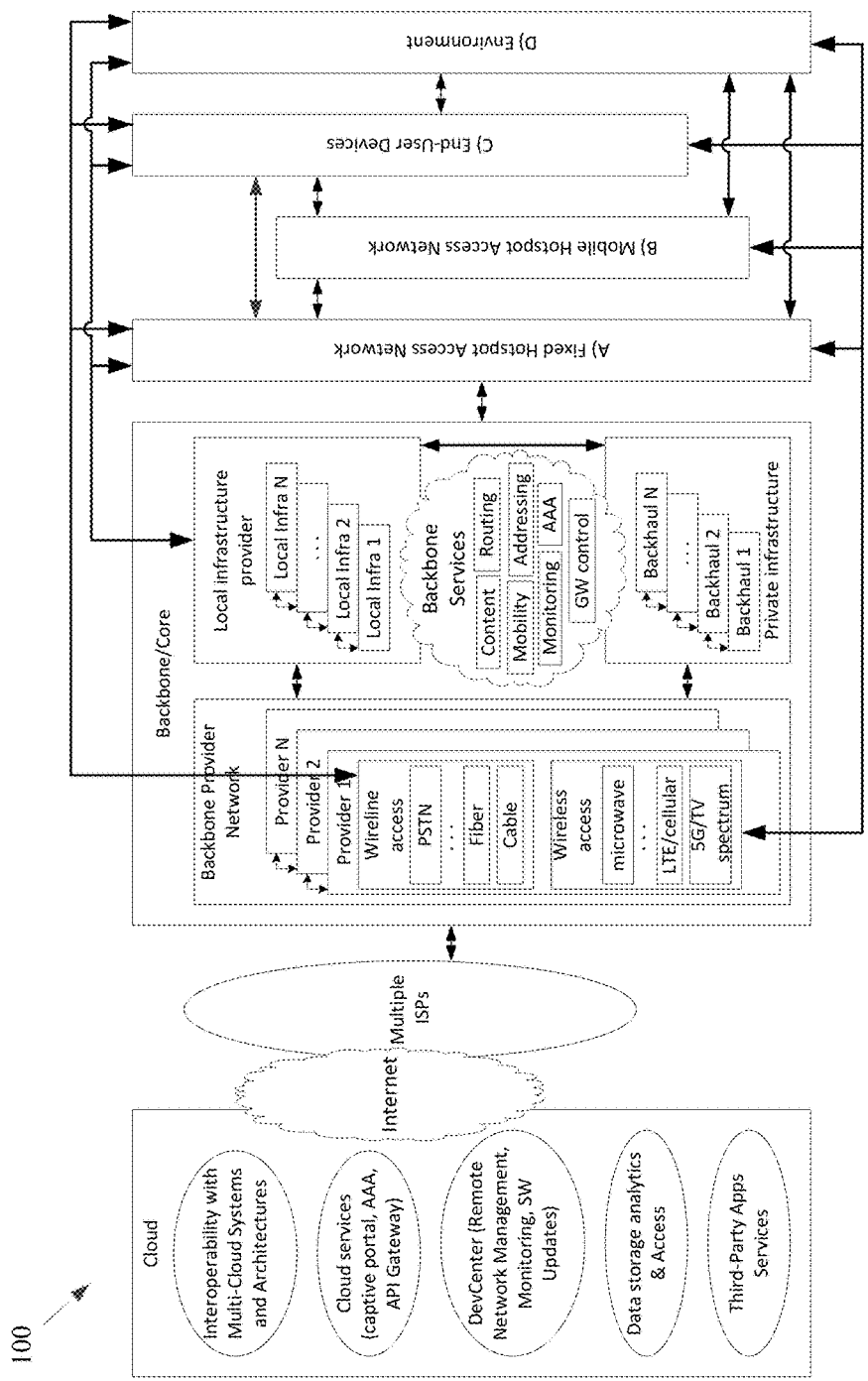
FIG. 1 shows a block diagram of a communication network, in accordance with various aspects of this disclosure.

Various aspects of this disclosure provide communication network architectures, systems and methods for supporting a network of mobile nodes. As a non-limiting example, various aspects of this disclosure provide communication network architectures, systems, and methods for integrating and/or integrating with a communication network comprising a complex array of both static and moving communication nodes (e.g., the Internet of moving things).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) (also referred to herein as a Network Controller, NC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs/NCs (e.g., in a fail-over scenario, load redistribution scenario, etc.), across different interfaces (or ports), etc. Note that the MC/NC may also be referred to herein as a Local Mobility Anchor (LMA), etc. Note that the MC/NC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors), etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
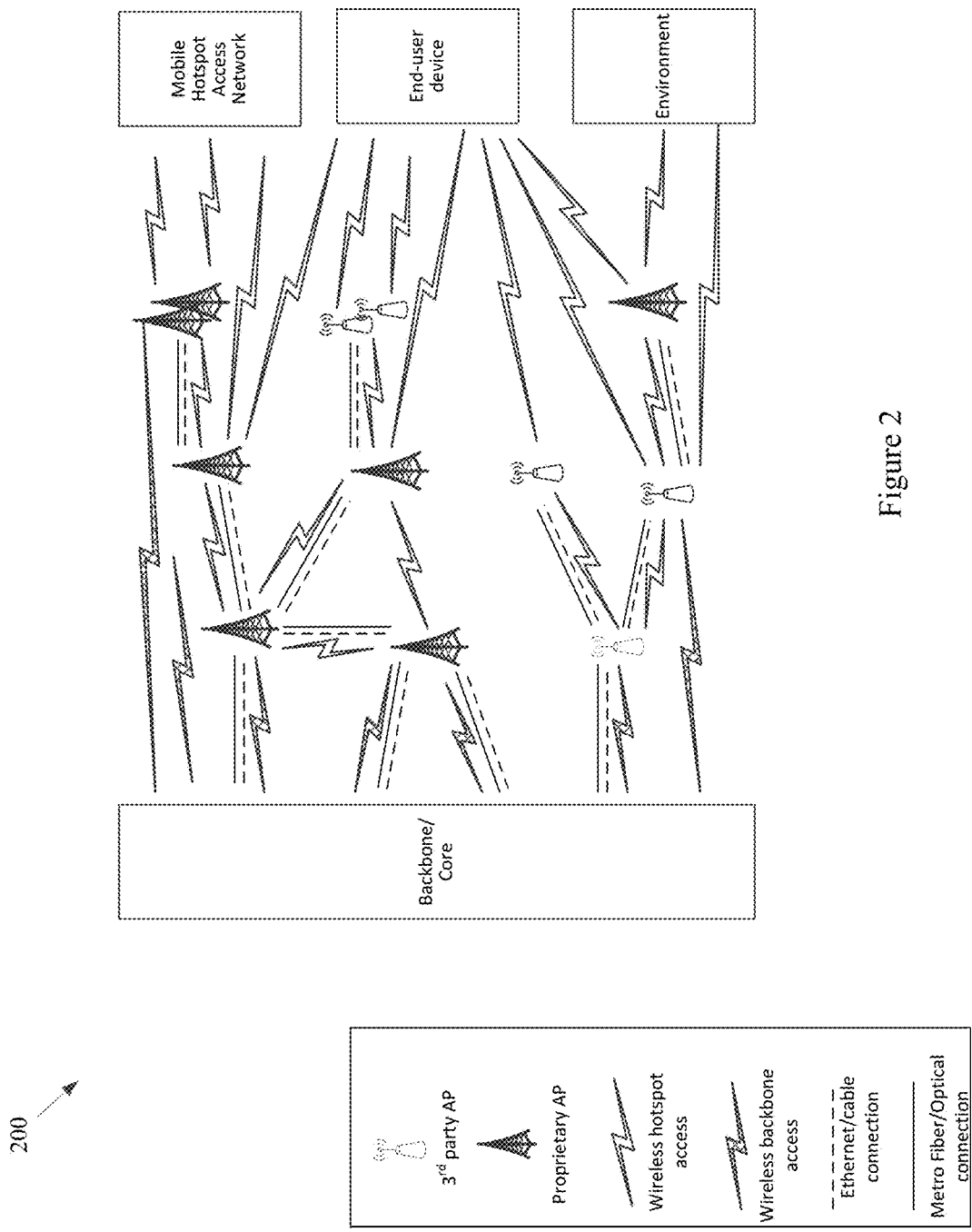
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
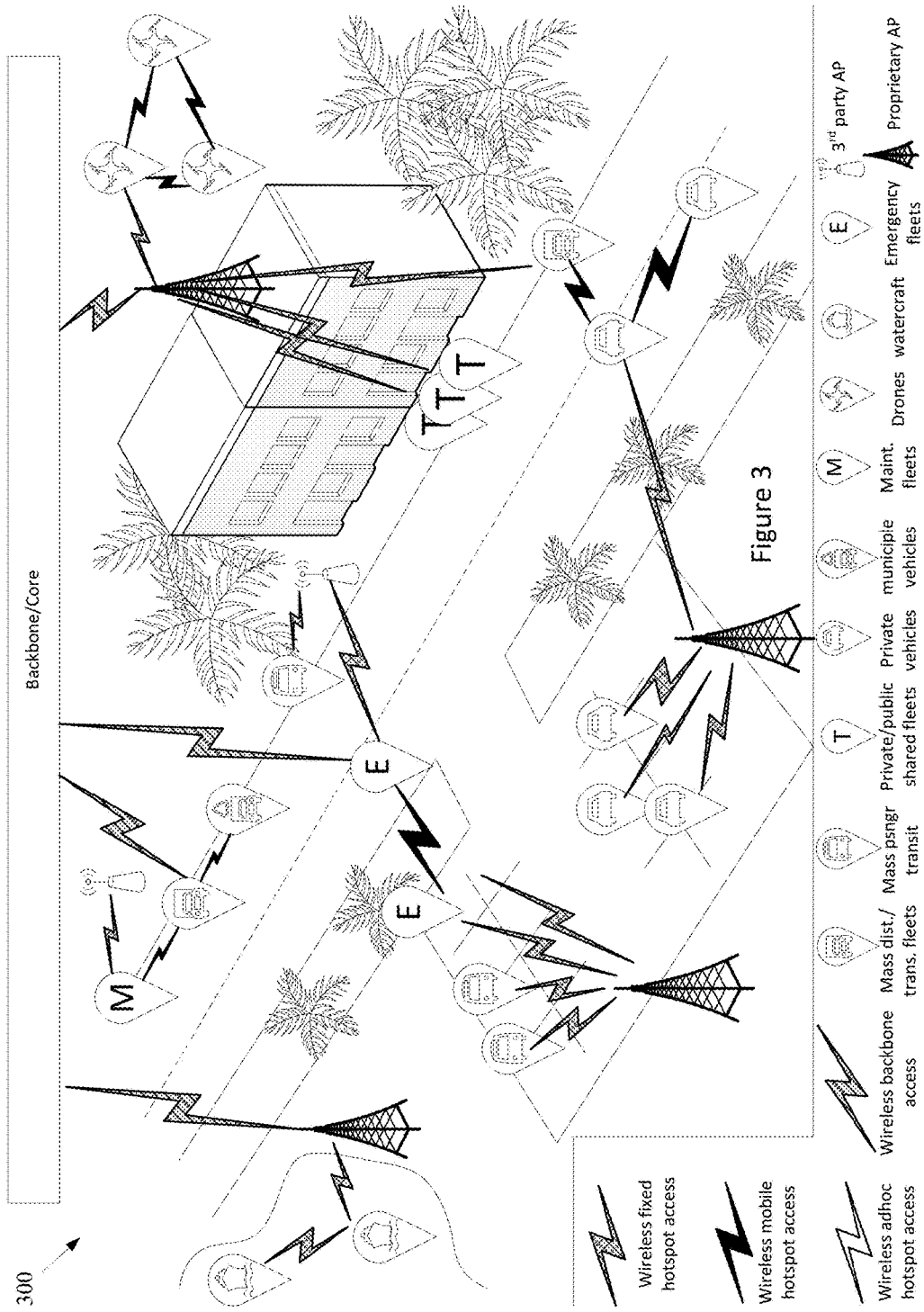
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
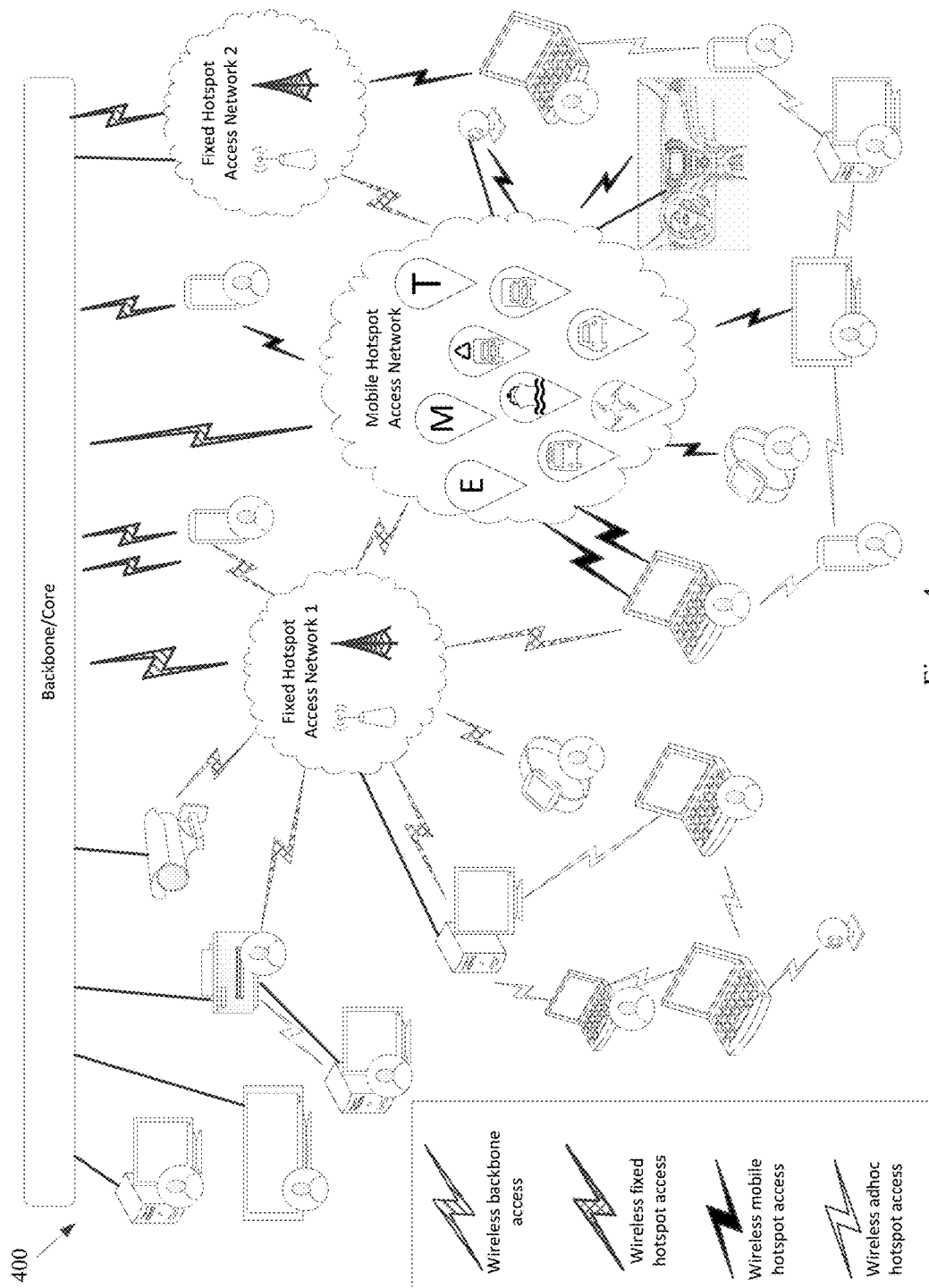
FIG. 4 shows a block diagram of a communication network, in accordance with various aspects of this disclosure.

The example network 100 of FIG. 1 also comprises a set of End User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End User Devices are shown with a wired communication link to a backbone provider, to a Fixed Hotspot Access Network, to a Mobile Hotspot Access Network, and to the Environment.

Figure 5A:
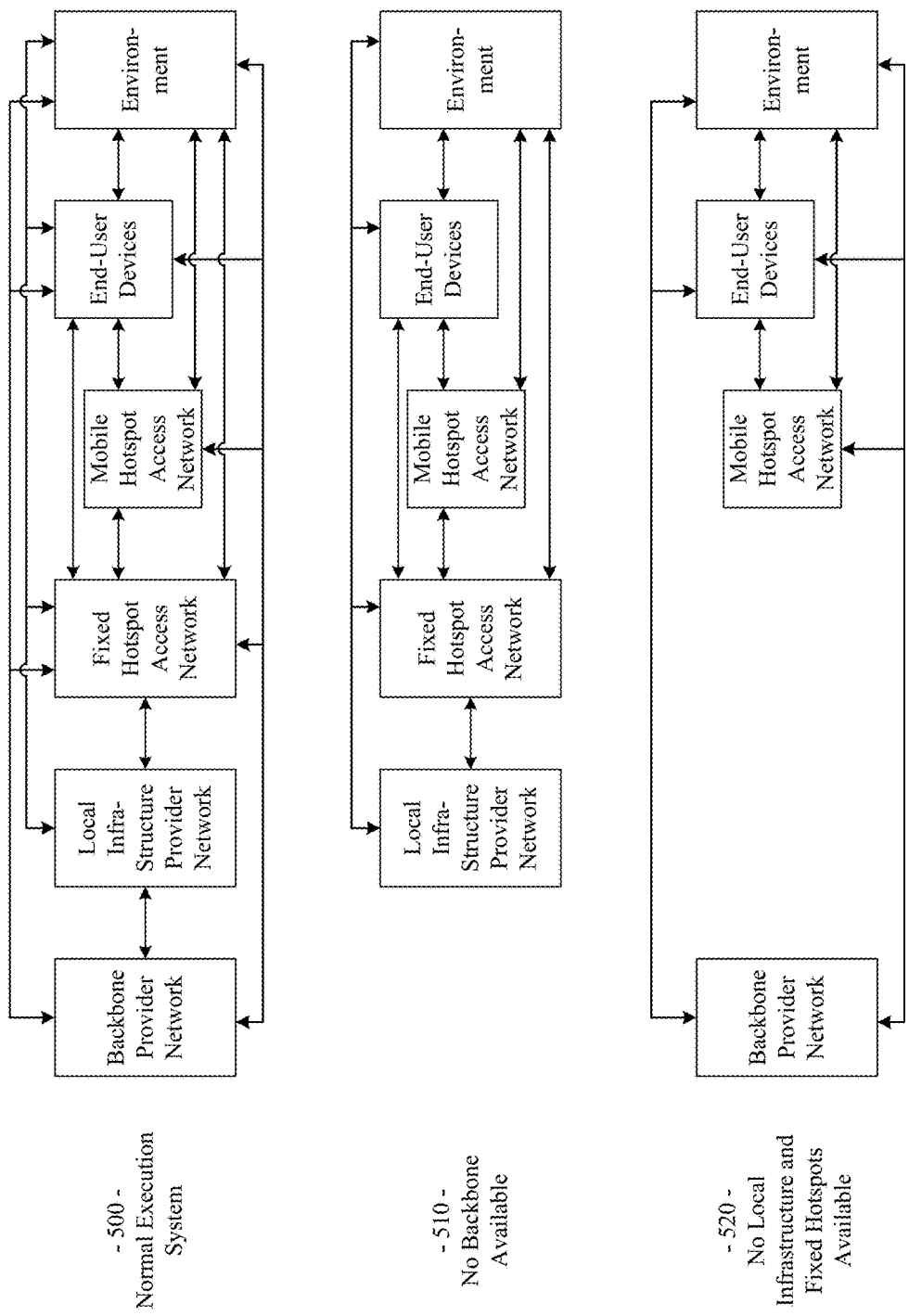
FIGS. 5A-5C show a plurality of network configurations illustrating the flexibility and/or and resiliency of a communication network, in accordance with various aspects of this disclosure.
Figure 5B:
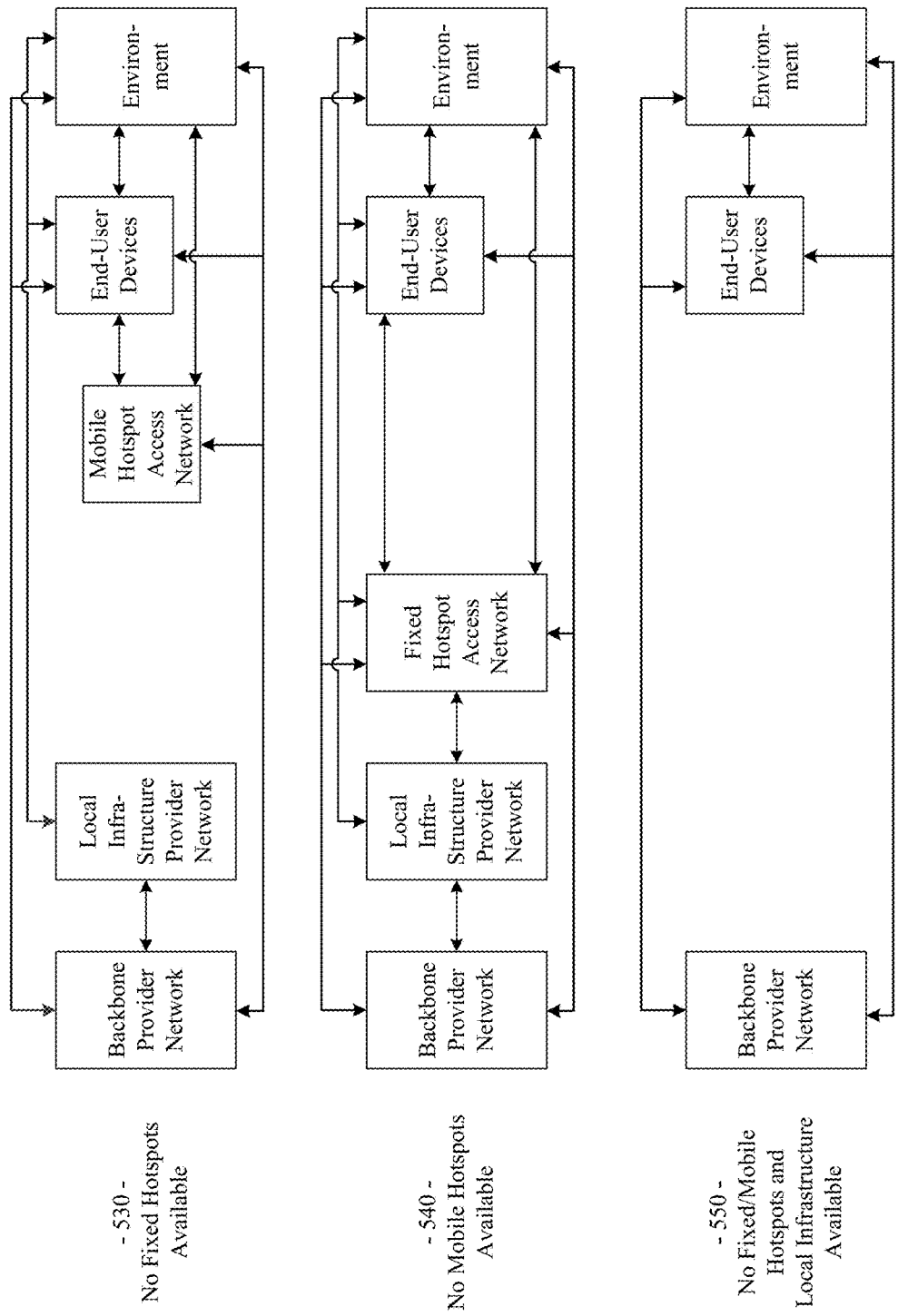
Figure 5C:
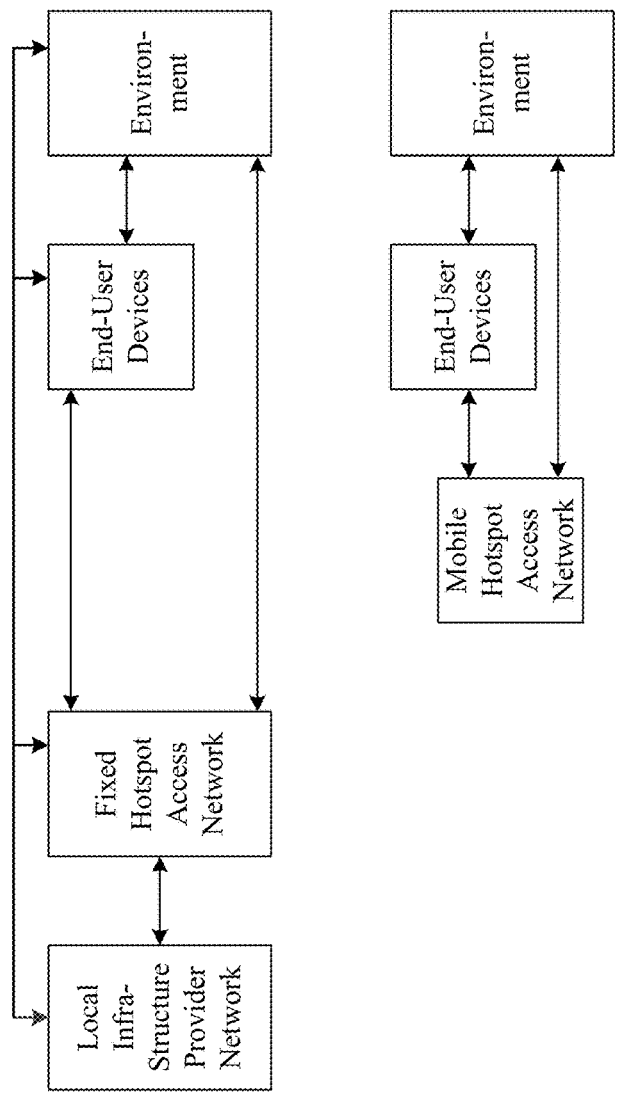

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end user devices, and/or environment devices via one or more wireless links. Many examples of such wireless coupling are provided herein. Additionally, the mobile hotspot access network is further shown in the first example mode 500 to be communicatively coupled to the end user devices and/or environment devices via one or more wireless links. Many examples of such wireless coupling are provided herein. Further, the end user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end user device and a server (e.g., a computer system) via the mobile hotspot access network, the fixed hotspot access network, the local infrastructure provider network, and/or the backbone provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end user devices, and/or environment devices via one or more wireless links. Many examples of such wireless coupling are provided herein. Additionally, the mobile hotspot access network is further shown in the second example mode 510 to be communicatively coupled to the end user devices and/or environment devices via one or more wireless links. Many examples of such wireless coupling are provided herein. Further, the end user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end user device and a server (e.g., a computer, etc.) via the mobile hotspot access network, the fixed hotspot access network, and/or the local infrastructure provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end user devices, and/or environment devices via one or more wireless links.

The mobile hotspot access network is further shown in the third example mode 520 to be communicatively coupled to the end user devices and/or environment devices via one or more wireless links. Many examples of such wireless coupling are provided herein. Further, the end user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end user device and a server (e.g., a computer, etc.) via the mobile hotspot access network and/or the backbone provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end user devices communicatively coupled thereto (e.g., leveraging the data plans of the end user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end user devices, and/or environment devices via one or more wireless links.

The mobile hotspot access network is further shown in the fourth example mode 530 to be communicatively coupled to the end user devices and/or environment devices via one or more wireless links. Many examples of such wireless coupling are provided herein. Further, the end user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end user device and a server via the mobile hotspot access network, the local infrastructure provider network, and/or the backbone provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end user devices communicatively coupled thereto (e.g., leveraging the data plans of the end user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end user devices and/or environment devices via one or more wireless links. Many examples of such wireless coupling are provided herein. Further, the end user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end user device and a server via the fixed hotspot access network, the local infrastructure provider network, and/or the backbone provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end user devices and environment devices may communicate directly to Fixed APs (e.g., utilizing Ethernet, Wi-Fi, etc.). Also for example, the end user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end user devices and/or environment devices via one or more wireless links.

The end user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end user device (e.g., instead of or in addition to the mobile hotspot access network).

The sixth example mode 550 may be utilized for any of a variety of reasons, non-limiting examples of which are provided herein. In an example implementation, for example in which an end user has not yet subscribed to the communication system, the end user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end user devices and/or environment devices via one or more wireless links. Many examples of such wireless coupling are provided herein. Additionally, the end user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end user device and a server via the fixed hotspot access network and/or the local infrastructure provider network. As will be seen in the various example modes presented herein, such communication may flexibly occur between an end user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end user devices, and environment devices.

As shown in FIG. 5C, and in FIG. 1 in more detail, the mobile hotspot access network is shown in the eighth example mode 570 to be communicatively coupled to the end user devices and/or environment devices via one or more wireless links. Many examples of such wireless coupling are provided herein. Further, the end user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
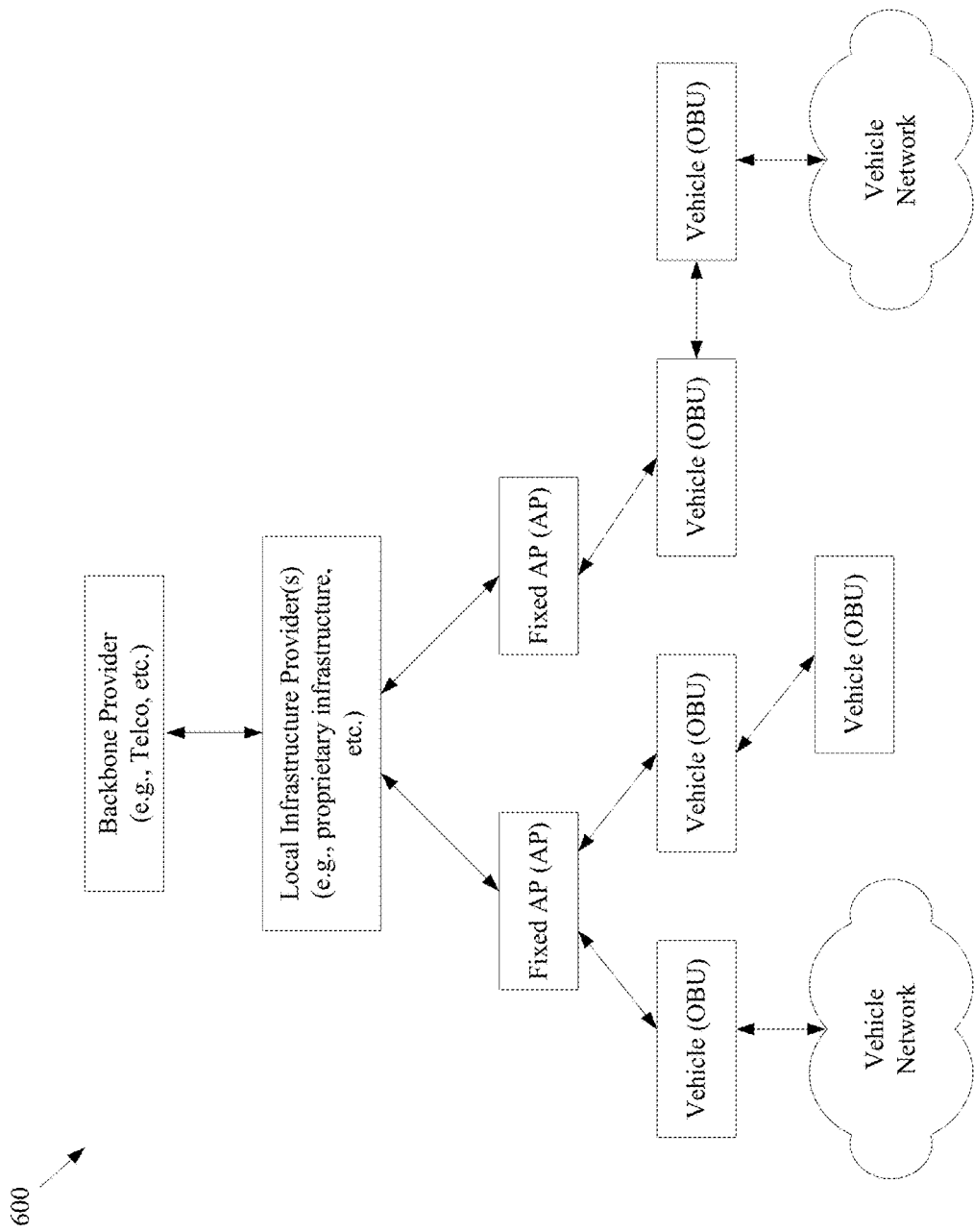
FIG. 6 shows a block diagram of an example communication network, in accordance with various aspects of this disclosure.

FIG. 6 shows yet another block diagram of an example network configuration, in accordance with various aspects of this disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC) may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure. A communication network (or components thereof) in accordance with various aspects of the present disclosure may be integrated with one or more other communication networks, for example communication networks of clients that are utilizing the communication network.

Figure 7:
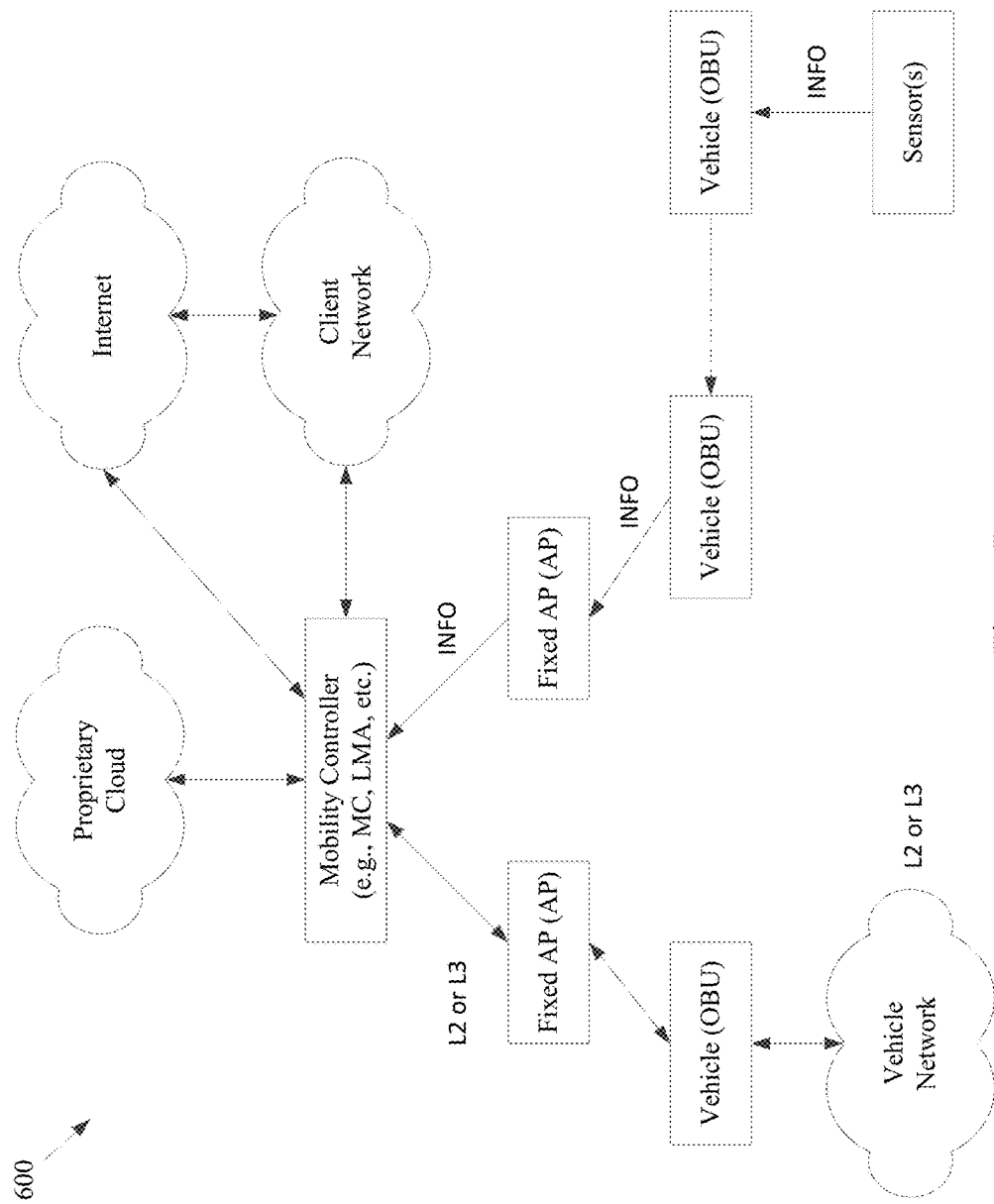
FIG. 7 shows an example integration configuration in accordance with various aspects of the present disclosure. The example network may, for example, share any or all characteristics with the other example networks discussed herein.

FIG. 7 shows an example integration configuration in accordance with various aspects of the present disclosure. The example network 700 may, for example, share any or all characteristics with the other example networks 100, 200, 300, 400, 500-570, 600, 800, and 1000 discussed herein. FIG. 7 illustrates a number of network elements described above, such as OBUs, APs, sensors, and an MC, which may, for example, correspond to the corresponding elements of the networks of FIGS. 1, 2, 3, 4, 5, 6, 8, and 10, described herein. In various implementations, a client (e.g., entity or user) wishing to employ a network of moving things (or a plurality of such clients) in accordance with the present disclosure will maintain its own communications network. For example, the client's communication network may comprise any of a variety of network characteristics such as, by way of example and not limitation, topology, protocol(s), encryption, authentication, speed, etc. A communication network, in accordance with various aspects of the present disclosure, may comprise various characteristics and capabilities that support convenient integration with such client networks (e.g., without substantial modifications to the client networks).

In addition to varying network topologies, different clients may have different respective views concerning session control (e.g., of Wi-Fi sessions, etc.), authentication control (e.g., Wi-Fi authentication control, etc.), privacy control (e.g., use of encryption, etc.), etc. For example, a first client may desire to retain such session and/or authentication control, while a second client might not. A communication network, in accordance with various aspects of the present disclosure, may comprise various characteristics that allow a particular client to retain or hand-off as much or as little control over the handling of their data traffic, as desired.

Additionally, due to any of a variety of considerations (e.g., security concerns, privacy issues, local laws, etc.), various clients may need to have control over whether their own data is stored in local databases (e.g., on a client owned/operated network) as opposed to, for example, utilizing Cloud data storage services (e.g., proprietary or Internet-based), the location of which may not be known. Such client control over choice of data storage may, for example, even be the case when Cloud-resident data is stored on a server within the geographical confines of the country, region, city, etc., of the client or end user of the stored data. A communication network, in accordance with various aspects of the present disclosure, may comprise flexible features that enable a client to choose to utilize Cloud data storage and/or analysis services, or not, depending on the individual needs of the client, contractual requirements, government regulations, etc. An implementation of a communication network in accordance with various aspects of the present disclosure may also, for example, comprise and/or support database and/or stored data replication, where the client may be permitted to choose the location(s) (e.g., network, physical, etc.) at which primary and replicated data is stored.

Various network implementations may also comprise a wide array of sensors spread throughout the operating environment (e.g., at fixed locations (e.g., co-located with APs, MCs, or other network elements), on vehicles (e.g., sensors of environmental, vehicle, or wireless network conditions), within or attached to end user devices, etc.). Such sensors may, for example, be provided by different respective suppliers, have different respective purposes, communicate in different respective manners (e.g., protocols, media, etc.), etc. A communication network, in accordance with various aspects of the present disclosure, may comprise features and capabilities (e.g., at a vehicle OBU, mobile AP, and/or fixed AP level) that operate to communicate with any of a large variety of sensor types (e.g., geolocation, environmental conditions (e.g., temperature, humidity, light level, wind speed/direction, gas sensing (e.g., CO, $CO_2$, NO, $SO_2$, etc.), etc.) utilizing the appropriate protocols (e.g., lower layer protocols, upper layer protocols, etc.), as appropriate.

An example network implementation in accordance with various aspects of the present disclosure may, by way of example and not limitation, provide communication for ticketing services (e.g., for buses, ferries, trains, etc.). In such an example scenario, the communication network may provide for communication of ticketing information in any of a variety of manners (e.g., utilizing inherent Internet access, utilizing intermittent access to fixed Wi-Fi hot spots, utilizing cellular if necessary, etc.), thereby flexibly providing for the communication of such information in the most cost-effective way that satisfies delivery time and/or reliability goals for the information. For example, real-time data may still be communicated when needed or when it becomes available at the source, and delay-tolerant data may be communicated economically and efficiently (e.g., within a few minutes, etc.) according to the timeliness required for each type or form of data. In a network of moving things in accordance with various aspects of the present disclosure, data that was once prohibitively expensive to obtain may now be obtained and communicated economically and in a timely manner. In an example transportation scenario, fleet operators may adapt the number of vehicles used in performing a transportation service, as needed, to maintain a desired level of service quality (e.g., time between pickups at a given location, avoid overloading, etc.) without wasting resources (e.g., seeking to maximize passengers carried, minimize vehicle operating miles, etc.).

The example communication system may, for example, comprise a Network Operations Center (NOC) that may be, by way of example not limitation, implemented in a proprietary Cloud, implemented on a server of the client, implemented in a distributed manner over various components, etc. The NOC may, for example, provide for centralized network and/or service management, and may include, by way of example and not limitation, a server computer system (e.g., local or remote, operating in a centralized or distributed way) that manages and controls the configurations of the communication system of the present disclosure. The NOC may, for example, be configurable and/or adapted to the needs of each client.

Various clients may also, for example, utilize a plurality of different Service Set Identifiers (SSIDs) representing each of a plurality of different respective wireless networks, each network of which may correspond to different operating rules (e.g., Dynamic Host Configuration Protocol (DHCP) rules, firewall rules, access type rules, etc.). For example, in accordance with various aspects of the present disclosure, a client may have different networks or sub-networks for different respective employees or employee groups, different respective working areas, etc. A communication network implementation, in accordance with various aspects of the present disclosure, provides for such operation.

To provide the above-mentioned flexibility and/or functionality, among other things, a communication network in accordance with various aspects of the present closure may comprise any of a variety of characteristics and parameters, non-limiting examples of which are provided herein.

For example, an example communication network implementation in accordance with various aspects of the present disclosure may comprise communication circuitry (e.g., hardware and/or software stored on a machine-readable non-transitory computer-readable medium) that operates to connect to Layer 2 (L2) networks (e.g., backend controllers, fixed APs, etc.). For example, such aspects may be Virtual Private Network (VPN)-compatible when the backbone/core network (e.g., backbone/core of FIG. 1) is not available. Also for example, an example communication network implementation may comprise communication circuitry that operates to connect to Layer 3 (L3) networks (e.g., backend controllers, fixed APs, etc.).

Additionally, an example communication network implementation in accordance with various of the present disclosure may comprise communication circuitry that provides L2 network functionality to end users (e.g., vehicle passengers, etc.). For instance, on the vehicle passenger/end user end of the communication link, the communication network may be completely transparent. In such a situation, a passenger may see no difference between utilizing the communication network of the present disclosure, and utilizing any of the other communication networks utilized by the passenger (e.g., home network, public network, work network, etc.). In an example implementation in accordance with aspects of the present disclosure, such network operation may for example comprise operation in accordance with DHCP (e.g., remote DHCP).

Further, an example communication network implementation in accordance with aspects of the present disclosure may comprise communication circuitry that provides L3 network functionality to end users (e.g., vehicle passengers, etc.). In an example implementation of aspects of the present disclosure, such operation may be in accordance with the Dynamic Host Configuration Protocol (DHCP) (e.g., using local DHCP). For instance, a component of the example communication network (e.g., a mobile AP or OBU, fixed AP, etc.) may provide Network Address Translation (NAT) functionality for end-user traffic.

Also, an example communication network implementation in accordance with aspects of the present disclosure may be configured to provide a captive portal, for example in a scenario in which the captive portal is not provided by the client network. The example communication network may, for example, comprise APIs (e.g., at the Cloud level) that may be used by communities, municipalities, universities, private enterprises, etc., to collect and/or deliver sensor information. Such collection and/or delivery may, for example, be provided economically in comparison to, for example, cellular data delivery costs. Note that APIs may be general or may be customized to a particular client or group of clients. Similarly, access to particular APIs may be controlled, and access may be granted on a per-client basis.

An example communication network implementation and/or any of the components thereof may, for example, comprise circuitry (e.g., hardware and/or software stored in a non-transitory machine readable medium, etc.) that provides end-to-end security, for example, from the OBU to the MC and beyond. The network may, for example, support DHCP Option 82, which may be used to provide additional security when DHCP is used to allocate network addresses. In such a situation, the use of Option 82 enables a network element to act as a DHCP relay agent to prevent DHCP client requests from untrusted sources from reaching the DHCP server. In an example implementation in accordance with aspects of the present disclosure, ID "tags" may be attached to the client to validate whether the client can be trusted. For example, the communication network and/or any component thereof may be compatible with Remote Authentication Dial-In User Service (RADIUS) servers for authentication operation. The Mobility Controller (e.g., MC of FIG. 7) may, for example, comprise gateway capability so that the MC can be used as a gateway to the Internet. Alternatively and/or in addition, the client network (e.g., the client network of FIG. 7) may also comprise such a gateway. Note that in accordance with various aspects of the present invention, a network of moving things may also provide "white-listing" services that permit only messages with specified network addresses to pass, which may for example avoid authentication steps, speed the data collection process, and reduce integration time.

Although in the example configuration shown in FIG. 7, the Mobility Controller is shown separate from the Client Network, it should be understood that the Mobility Controller may also be integrated into the Client Network. Additionally, although the example configuration shown in FIG. 7 shows the Client Network integrated with the rest of the network through the Mobility Controller, the scope of this disclosure is not limited thereto. For example, in a network in accordance with the present disclosure, the Client Network may be integrated with the rest of the network via the Internet and/or the Proprietary Cloud elements shown in FIG. 7.

Additionally, the example communication network implementation may provide interfaces that flexibly allow a client to direct data (e.g., end user data, sensor data, fleet data, network operation data, etc.) for storage in the Cloud, in a specific server (e.g., owned or controlled by the client or another), etc., in accordance with the client's requirements.

A client may, for example, be provided access to the communication network through a VPN, for example for monitoring or diagnosing. An example communication network implementation may further, for example, support a single Virtual Local Area Network (VLAN) in an access mode or a plurality of VLANs in a trunk mode.

A communication network in accordance with various aspects of this disclosure may be utilized in any of a wide variety of scenarios, a few non-limiting examples of which are presented herein. Each of such scenarios may, for example, comprise characteristics and functionality to which the flexible communication network of the present disclosure is adaptable.

In an example implementation comprising a public mass transportation fleet (e.g., a public taxi, bus, or other ground transportation service), an L2 core network might not be available. Accordingly, the fixed APs in such a situation may be connected to the MCs (e.g., LMAs) through a secure VPN. Each AP may, for example, store information identifying the routes to the different MCs, which may then be utilized, for example, for load balancing purposes, for redundancy purposes, etc.

In an example implementation comprising a city-wide or municipality installation in accordance with the present disclosure, city operators may access data (e.g., sensor data, vehicle data, end user data, etc.) through secure APIs (e.g., of the Cloud) and then integrate the accessed data into their own software applications (e.g., dashboards). In such a manner, the underlying operation of the network may, for example, be transparent to the operators of the software application. In an example implementation, a third party may similarly be able to access information obtained by, communicated by, or stored in the network through secure APIs.

In an example communication network implementation, for example utilizing a city infrastructure provider (e.g., a local or regional wired or wireless telephone, data, or internet provider, etc.), the OBUs may provide L3 services to the users (e.g., vehicle occupants, etc.) carrying end user traffic through the use of Network Address Translation (NAT). Since the network implementer has control over the end user's traffic, the network implementer may control captive portal operation, manage accounting activities, etc.

In an example implementation comprising a port installation, the communication network may transport the end user's Wi-Fi traffic to the core of the port authority's network (e.g., a network of a port authority of any country or municipality, etc.) through a tunnel (e.g., an L2 tunnel). In such an implementation, the port operator may have full control over the authentication process, and may also have the ability to assign multiple SSIDs to different VLANs in the core network.

Depending on the implementation scenario, VLAN translation may also be performed in accordance with various aspects of the present disclosure. For example, in an implementation (e.g., in an in-building network implementation) in which the core network is provided through a third-party network, the communication network and/or various components of the communication network according to the present disclosure may perform VLAN translation, as needed, since various VLAN IDs may already be in use in the third-party network.

As discussed herein a communication network in accordance with various aspects of the present disclosure may, for example, provide a commonly used air interface (e.g., Wi-Fi, DSRC, Bluetooth, etc.) at the end user device and/or sensor level. Also, universal APIs may be provided (e.g., at the Cloud level), where such APIs may be utilized by most of the devices (e.g., high-level networked servers and devices, mid-level infrastructure equipment, vehicle level mobile AP equipment, etc.). Additionally, the communication network may support L2 and/or L3 layer networking, in accordance with each client's needs.

Figure 8:
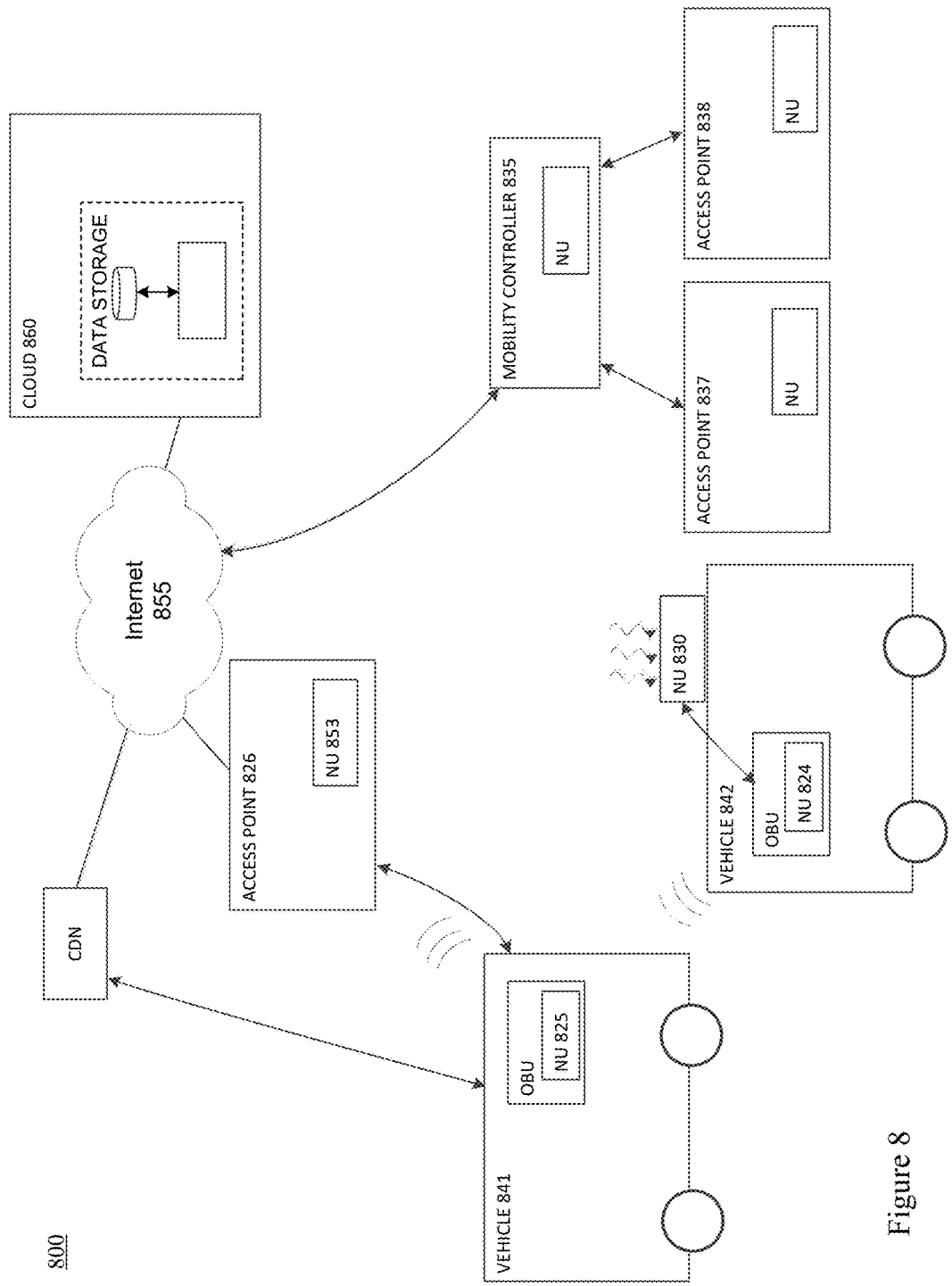
FIG. 8 shows a block diagram of an example communication network 800, in accordance with various aspects of the present disclosure.

FIG. 8 shows a block diagram of an example communication network 800, in accordance with various aspects of the present disclosure. The example network 800 may, for example, share any or all characteristics with the other example methods, networks, and/or network components 100, 200, 300, 400, 500-570, 600, 700, 900, and 1000, discussed herein. Notably, the example network 800 of FIG. 8 shows a plurality of vehicles (or mobile APs, or OBUs), each communicatively coupled to a fixed AP (or RSU), where each mobile AP may provide network access to a vehicle network (e.g., comprising other vehicles or vehicle networks, user devices, sensor devices, etc.), for example a Wi-Fi network to which end user devices may connect, with which communication with sensors may be performed, etc. The mobile APs may, for example, move in and out of communication range of various sensors. The mobile APs may, for example when in-range of such sensors, gather information from such sensors in a power-efficient and network-efficient manner, many examples of which are provided herein.

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private/client networks, etc.

The functionality of the various fixed and mobile elements of a network of moving things in accordance with various aspects of the present disclosure may include software or firmware that is executable by processors, and may include data used by such processors that, for example, control the establishment and management of communication over the various wired and wireless links, communicate data between various elements, enable configuration of various elements according to the use of the network portions, and perform diagnostics and maintenance of network elements. In accordance with the present disclosure, a network of moving things may provide functionality that enables the network to continue to evolve after network deployment, enabling the distribution of updated software, firmware, and/or data/configuration information that provides new features and enhancements in a curable and reliable manner. In accordance with various aspects of the present disclosure, such update information for updating software, firmware, and/or data/configuration information may be referred herein to simply as a software update, an "update," or "update file," and may include digital information representing a configuration of a network comprising one or more network entities, software, firmware, and/or the arrangement of the network entities with respect to one another. Such updates may be agnostic of the location and expected behavior, and may be totally adaptable to any constraints and requirements desired by the system operator or users. In accordance with various aspects of the present disclosure, updates may be marked as "safe" (e.g., "stable") and "unsafe" (e.g., "toxic"), thereby enabling the network to avoiding flooding the applicable elements of the network of moving things with updates that are likely to cause malfunctions or unexpected behaviors in those elements. In accordance with the present disclosure, updates may have different associated severity levels, in which some updates may be required to be immediately distributed and applied to the applicable elements of the network, while for other updates, a more relaxed approach may be employed for performing the change to the destination recipient.

In accordance with various aspects of the present disclosure, support for both incremental and full updates may be provided to allow system evolution as well as system recovery, including updates for self-contained parts of the operative system such as, for example, bootloaders, backup partitions, and any other modules or portions of the software/firmware/data/configuration information of a system element. Updates may, for example, be downloaded from the network entity that is closest, or the entity that is able to provide the information with the least delay, the most quickly, or at the highest speed, depending on the point in time at which the download is initiated, the vehicles and access points that are within range, the geographic positions/locations of the network entities, the expected behavior of various network entities, and the update severity level.

A system in accordance with various aspects of the present disclosure supports an update mechanism that distributes and controls the software, firmware, and data/configuration information running in the various network elements in an Internet of moving things, and provides an agnostic updating mechanism that supports different software/firmware/data/configuration versions based on, for example, the type of vehicular network, the type of client, the type of vehicle, the type of access point, etc. A system in accordance with the present disclosure supports multiple dissemination algorithms for performing updates with, for example, centralized, distributed, and epidemic methods of distribution of updates, while providing secure distribution and installation of certified updates.

The example network 800 of FIG. 8 may, for example, share any or all characteristics with the other example methods, networks, and/or network components and data 100, 200, 300, 400, 500-570, 600, 700, and 1000 discussed herein. As illustrated in FIG. 8, the network 800 includes a number of network components (e.g., cloud 860; vehicles 841, 842; access points 826, 837, 838; and mobility controller 835). The vehicles 841, 842; access points 826, 837, 838; and mobility controller 835 each contain what may be referred to herein as a "network unit" (NU), represented as having respective NUs. In the context of a vehicle, the NU may be part of, for example, an OBU, an AP, and an MC, as previously described above.

In accordance with aspects of the present disclosure, the mobile NUs may have access to a number of communication methodologies including, for example, a "DIRECT" communication methodology that involves direct communication with the destination entity, an "OPPORTUNISTIC" communication methodology that communicates with the destination entity only when one specific communication technology is available (e.g., direct short-range communication (DSRC) connectivity to a specific access-point), and an "EPIDEMIC" communication methodology that may deliver the message to the next available networking neighbor of the entity sending a message. In such a situation, the networking neighbor that is sent the message is then responsible for continuing the delivery of the message to its own neighbor node(s), thereby transporting the message through various network entities until the final destination is reached. In accordance with aspects of the present disclosure, NUs that are "fixed" rather than "mobile" may be configured to rely on "DIRECT" communication methodologies. Additional details related to the above may be found, for example, in U.S. Provisional Patent Application No. 62/272,750, entitled "Systems and Methods for Remote Software Update and Distribution in a Network of Moving Things," filed Dec. 30, 2015, and U.S. Provisional Patent Application No. 62/278,662, entitled "Systems and Methods for Remote Configuration Update and Distribution in a Network of Moving Things," filed Jan. 14, 2016, the complete subject matter of each of which is hereby incorporated herein by reference, in its respective entirety.

A network of moving things in accordance with aspects of the present disclosure is able to communicate data with both mobile and fixed NUs. For example, the mobile NUs 824, 825 in the vehicles 842, 841 of FIG. 8 may not have continuous access or communication with data storage of cloud 860. In accordance with various aspects of the present disclosure, such mobile NUs may be configured to leverage any existing communication connections that are available (e.g., cellular, Wi-Fi, DSRC, Bluetooth, etc.). In accordance with aspects of the present disclosure, mobile NUs such as, for example, the NUs 825, 824 of vehicles 841, 842 of FIG. 8 may, for example, communicate with fixed NUs such as, for example, the NUs 826, 837, 838 of FIG. 8 using the EPIDEMIC communication methodology, described above.

In accordance with aspects of the present disclosure, various sensors (e.g., sensors connected to NU 830) may not have direct communication with the data storage of the cloud 860, and therefore may leverage the connectivity provided by an NU such as, for example, the "relay" NU 824 of vehicle 842, to which they may connect. Such relay NUs (RNUs) may communicate with any such sensor, in order to enable any such sensors to communicate sensor data with, for example, the cloud 860.

As described above, a network of moving things such as one in accordance with various aspects of the present disclosure may include a variety of network entities such as, for example, Mobility Controllers (MCs or Network Controllers (NCs)), Network Units (NUs), Fixed Access Points (FAPs) and Mobile APs (MAPs), that can be installed, maintained and/or controlled by different organizations working together with the same client of the network of moving things. Additional information about an example of such an integrated network may be found, for example, in U.S. Provisional Patent Application No. 61/221,997, entitled "Integrated Communication Network for a Network of Moving Things," filed Sep. 22, 2016, the complete subject matter of which is hereby incorporated herein by reference. In accordance with aspects of the present disclosure, each network entity may be setup and integrated into the network of moving things according to a timeline set by the organization performing the setup and installation of that network entity, and that timeline need not depend on the timeline of the organization responsible for performing the setup and installation of another network entity. In this manner, the processes of the various organizations responsible for the setup and installation of the various portions and elements of a network of moving things in accordance with aspects of the present disclosure need not be synchronized.

In many instances, the Fixed APs (FAPs) of a wireless network may be installed and activated by the infrastructure provider (e.g., a wireless Internet Service Provider (ISP) or local telephone company (Telco)). Such organizations are quite different from and operate in a different manner than does the type of organizations that may be called upon to install and/or activate Mobile APs (MAPs) used in a network of moving things such as that described herein. The organizations installing and/or activating MAPs may, for example, be the owners or operators of fleets of vehicles such as, for example, buses, taxicabs, and delivery and trucking companies. In addition, Mobility Controllers (MCs or NCs) used in a network of moving things in accordance with the present disclosure may be owned and/or controlled by the information technology (IT) support teams of the clients using the network of moving things. The organizations that own and/or control the MCs/NCs may have their own responsibilities, and may not be able to configure the MCs/NCs at the time of the installation of the FAPs and/or MAPs. In addition, the IT support teams of the clients may desire a solution that seamlessly integrates with the remaining elements of the infrastructure. Each client of a network of moving things may have a different internal network architecture and different system components, and may require a network solution that integrates with the system components in the client network architecture with as few modifications as possible. A network of moving things in accordance with aspects of the present disclosure is ready to be quickly deployed at a time chosen by a client, and supports the activation of different network configurations based on the requirements of the client. In this manner, a network of moving things as described herein provides a flexible process enabling integration and setup of a network of moving things in an efficient manner.

As the number of deployments of networks of moving things increases over time, an automated process in accordance with various aspects of the present disclosure functions to get such networks deployed quickly and in accordance with the requirements of the client. A network in accordance with the present disclosure enables quick setup of the final solution in the right configuration, from a location that may be remote from the network, without the need for further intervention by the various organizations responsible for infrastructure and network entities, after the process of installing the various network entities has been completed.

In a network of moving things in accordance with various aspects of the present disclosure, after installation of network entities (e.g., FAPs, MAPS, MCs/NCs, etc.), each network entity is be able to detect the other network entities that have been made a part of and are available in the network (e.g., at the time of installation of each network entity), and are able to communicate configuration information among the network entities, to automatically construct the desired network of moving things in which all of the network entities smoothly communicate together to meet the requirements of the client.

The automated processes of a network of moving things in accordance with various aspects of the present invention result in a lower cost per network and network element deployed, shorten the lead time to network deployment, and improve reporting capabilities.

A network of moving things in accordance with various aspects of the present disclosure provides an automated mechanism that supports a process of installation and setup of networks that does not depend on the synchronized installation of all the network entities that comprise the resulting network solution. The process enables any kind of configuration to be deployed over the entire network solution, and provides compatibility with various wired and/or wireless infrastructure arrangements of the client using the network solution, along with ease of installation and setup. Various aspects of the present disclosure enable clients of the network to specify their needs and requirements for a network of moving things, which may then be automatically mapped into configuration information representing the details of the resulting network solution for that client, which may then be distributed to the various network entities. The configuration information may include configuration options and parameters related to various aspects of network operation including those for, by way of example and not limitation, Dynamic Host Configuration Protocol (DHCP), Domain Name Service (DNS), cellular infrastructure, assigned Internet Protocol and other address pools, Long Term Evolution (LTE) network particulars, Virtual Local Area Networks (VLANs) parameters, Virtual Private Networks (VPNs) operation, various aspects of secure access, and many, many more.

A network of moving things in accordance with aspects of the present disclosure is easily integrated with a variety of network architectures that may be used by clients of such a network, and provides a highly customizable process to allow the resulting network solution to be quickly configured and re-configured whenever and wherever required, and enables the use of different method of booting, initializing, and starting operation of communication among the various entities of the network.

A network of moving things according to aspects of the present disclosure may perform what may be referred to herein as Automatic Network Integration (ANI), which enables the operator of the network, the clients that will use the network, and any others involved in network installation and setup (e.g., a subcontractor, installer, etc.) to perform a quick network integration, using various technical details known in advance. Such network integration will improve network operations, reduce costs, reduce the time involved in installation and setup, and permit the execution of multiple tasks in parallel, even when all details of the network have not yet been fully defined.

The configuration information used in performing a network integration in accordance with the present disclosure may be divided into four categories referred to herein as "Cellular," "Wi-Fi Authentication/SSID," "Network," and "Mobility Controller." As previously described above with respect to the example methods, networks, and/or network components and data 100, 200, 300, 400, 500-570, 600, 700, 900, and 1000 discussed herein, a network of moving things according to various aspects of the present disclosure may use a number of different communication links in communication between network entities.

The configuration information category of "Cellular" may include, for example, all of the information related to a cellular carrier's network that is being used by a network in accordance with the present disclosure, as well as information for the MAPs that are to be used. It should be noted that different networks of moving things may use different cellular carriers (i.e., different cellular service providers), that a single network of moving things may be configured to be used by a number of different clients, and may have the ability to use the communication paths or links available via a number of different cellular carriers or cellular service providers. Even when the wireless infrastructure of a cellular carrier is used as a backup means of communication, or is used to fill the gaps where, for example, DSRC or other forms of wireless communication is not usable, various configurable parameters are employed to enable a network of moving things to make use of the available cellular infrastructure such as, for example, whether the Internet Protocol (IP) addresses provided by the cellular carrier will be "public" or "private," and information that identifies the make/model of, for example, a cellular capable "dongle" or interface.

The information category of "Wi-Fi Authentication/SSID" may include, for example, how many and what Service Set Identifiers (SSIDs) will be used by the client, and which of the network names (i.e., SSIDs) will be visible (i.e., broadcast by the APs (e.g., FAPs and/or MAPs)). For example, the configuration information for a network of moving things according to the present disclosure may indicate whether the end user of a client, when accessing a network access point having a particular SSID, is to be provided access to what may be referred to as a "captive portal." The term "captive portal" may be used herein to refer to a special web page that is shown before normal use of the Internet or network is enabled. If the end user in such an instance is to be provided with a "captive portal," the configuration information for the client may include, for example, whether the "captive portal" will be private, and if so, the VLAN identifier (VLAN ID) to which the traffic for the "captive portal" is to be forwarded. If, instead, the "captive portal" is to be "public," the configuration information for the client may include an indication of whether the "captive portal" will use a "captive portal" provided by the operator of the network of moving things, or one provided by the client.

In addition, the information category of "Wi-Fi Authentication/SSID" may include, for example, for each SSID, whether authentication may be done through via a Remote Dial-In User Service (RADIUS) server, a "captive portal" (e.g., using Universal Access Method (UAM), etc.), a conventional SSID/Password (e.g., with a security algorithm such as Wired Equivalent Privacy (WEP), Wi-Fi Protected Access (WPA), Wi-Fi-Protected Access II (WPA2), etc.), or "open"/free access (e.g., no security/password). In the case of use of RADIUS for authentication and accounting, the configuration information may also include the RADIUS IP address, as well as a secret key, and an indication of whether the end user traffic is to be redirected to a specific VLAN. If end user traffic is to be redirected to a specific VLAN, the configuration information may include the VLAN ID for each SSID (e.g., in case of the assignment is not dynamic).

The information category of "Network" may include, for example, an indication of whether MCs/NCs and FAPs are to be connected to the same "control" VLAN, and whether the "control" VLAN is to be configured as "native" on each port to which the MCs/NCs and FAPs will be connected. If configuring the "control" VLAN as "native" is not possible, the configuration information may include a VLAN ID of the VLAN that will be used for control, which may be provided by the client.

Whether or not the "control" VLAN is configured as "native," the client of a network of moving things according to the present disclosure may choose to run DHCP on the VLAN. If the use of DHCP on the VLAN is possible, the DHCP may provide IP addresses within a certain range of IP addresses, may use a certain network mask (i.e., "netmask"), and such information may be part of the configuration information described herein. If, however, use of DHCP on the VLAN is not possible, the configuration information may include a range of IP addresses that will be available, a network mask, and gateway and DNS server IP addresses, which may be provided by the client that will be using the example network of moving things described herein. The configuration information according to various aspects of the present disclosure may also include an indication of whether FAPs will be deployed in a "foreign network." The term "foreign network" may be used herein to refer to a situation in which a FAP is deployed in an IP network that is different from the IP network in which the associated MC/NC is deployed. In such a situation, the FAP may not be able to communicate directly with the MC/NC, and the MC/NC may need to handle the connection to the FAP in a different manner. The configuration information of a network of moving things according to aspects of the present disclosure may also include an indication of whether Simple Network Management Protocol (SNMP) monitoring is to be enabled, which may be determined by the client using the network.

The information category of "Mobility Controller" (MC) (also referred to herein as a "Network Controller" (NC)), may include, for example, a "public" IP address of an MC/NC. As described hereinabove, an MC/NC in accordance with the present disclosure operates to maintain the communication sessions of the end users, and manages seamless handovers between various APs (e.g., FAPs, MAPs, etc.) and a cellular service provider (e.g., when needed and available). The use of a "public" IP address with an MC/NC enables improvements in the maintenance of software of various network entities, and in the Quality of Experience (QoE) and Quality of Service (QoS) experienced by the end user. A "public" IP address may be provided by, for example, a client that uses a network of moving things as described herein, or by a cellular service provider (i.e., cellular carrier) at which the MC/NC may be installed, to enable seamless handover. In a network of moving things according to various aspects of the present disclosure, a dedicated IP address may be assigned to each MC/NC.

If, however, it is not possible to have a "public" IP address assigned to an MC/NC, a connection may be established with an MC/NC according to the present disclosure by assigning, for example, a "port" that may be used to forward traffic from a "public" IP address to an "internal" IP address that may be available on the MC/NC. An indication of the "port" used in such a situation (i.e., where a "public" IP address is not available for assignment to the MC/NC) may be included in the configuration information of a network of moving things as described herein. Alternately, the Media Access Control (MAC) (i.e., "physical") addresses of the MC/NC may be employed, if a DHCP server is able to assign the MAC address. Configuration information according to various aspects of the present disclosure may also include a sub-range of a pool of IP addresses available for MCs/NCs, in which the AP addresses assigned to each MC/NC may be manually configured. Additional information for an example Mobility Controller/Network Controller may be found, for example, in U.S. Provisional Patent Application No. 62/222,098, entitled "Systems and Methods for Managing Mobility in a Network of Moving Things," filed Sep. 22, 2015, and in U.S. Provisional Patent Application No. 62/273,715, entitled "Systems and Methods for Managing Mobility Controllers and Their Network Interactions in a Network of Moving Things," filed Dec. 31, 2015, the complete subject matter of each of which is hereby incorporated herein by reference.

Information used in configuring a network of moving things in accordance with various aspects of the present disclosure may be collected using, for example, a questionnaire presented to the client as a paper form, and/or in the form of an online document or website form, and may then be processed into what may be referred to herein as a Master Configuration File (MCF) in which configuration information for all network entities is present, and which each network entity processes to generate its own individual configuration information used by that entity to provide service to a client. The following discussion provides additional details about the format and content of an example MCF in accordance with various aspects of the present disclosure.

FIGS. 9A and 9B illustrate an example Master Configuration File (MCF) 900, in accordance with various aspects of the present disclosure. The example MCF 900 shown in FIGS. 9A-9B exhibits a hierarchical structure in which levels in the hierarchy as identified by categories, which may also be referred to herein as "topics." In the example of FIGS. 9A-9B, the MCF begins by identifying the "client" to which the network configuration applies and to be served using the network configuration of the MCF 900, which is shown in the example of FIG. 9A as client "New York Bus." As shown in FIGS. 9A-9B, the MCF 900 then defines configuration information for the "Mobility Controller (MC)" category/topic (also referred to herein as a "Network Controller"), "mc," which includes configuration information for three networks "10," "11," and "12." The configuration information for each of networks "10," "11," and "12" is further defined by configuration information for both a "public" and a "local" network. Configuration information specific to each of networks "10," "11," and "12" (e.g., "public" and/or "private") is also provided including, as shown in the example of FIG. 9A, parameters specifying a Virtual LAN (VLAN) identifier, "vlan_id"; an IP Address, "ip"; a network mask, "netmask"; a gateway IP address, "gw_ip"; a list of DNS servers, "dns_servers_list"; and a range of "port" addresses shown in the example in the form [begin:end] (e.g., [0,0] or [1211:1220]).

As shown in FIGS. 9A-9B, the MCF 900 then defines configuration information for the "Network" category/topic, "network," specifying the type of infrastructure connection used (e.g., "vlan_id," "vpn," or "mix"), and where applicable, whether the "control VLAN" has DHCP, and whether SNMP is enabled.

The example MCF 900 of FIG. 9A then defines configuration information for the "Cellular" category/topic, "cellular," and specifies whether the network OBUs have "public" IP addresses.

In addition, the example MCF 900 defines configuration information for the "Wi-Fi Authentication/SSID" category/topic, "wifi," including indications of which Wi-Fi channels are to be used, and provides configuration information for five different Wi-Fi networks (i.e., "NetA," "NetB," "NetC," NetD," and NetE"). It should be noted that although configuration information for five Wi-Fi networks are shown in the example MCF 900, the number of Wi-Fi networks in FIGS. 9A-9B is for illustration purposes only, and does not represent a specific limitation of the present disclosure. For each of those five Wi-Fi networks, the MCF 900 provides information identifying the Service Set Identifier (SSID), "ssid," and an indication of the type of authentication to be used, "authentication". Additional parameters for each Wi-Fi network are also provided including a VLAN ID, "vla-n_id"; a RADIUS server IP address, "radius_ip"; and a RADIUS secret, "radius_secret".

In accordance with various aspects of the present disclosure, an MCF such as the MCF 900 of FIG. 9 is processed separately by each network entity (e.g., OBU, MC/NC, FAP, MAP, etc.), and each network entity extracts individual configuration information for the entity processing the MCF. For example, a particular MC/NC in the network may process the "Mobility Controller" category/topic of the MCF and may retrieve from the MCF, information that indicates that the MC/NC processing the MCF has an "exclusive" IP address or a "shared" IP address. Further, the MCF may contain configuration information that a "shared" IP address is indicated, and the MC/NC may then know to use a VPN to connect to OBUs, based on that indication. The MC/NC may also update the network configuration according to the MCF.

The particular MC/NC may also process the "Cellular" category/topic of the MCF and find an indication that the OBUs will not have public IP addresses. In such a situation, the MC/NC may then know that the MC/NC will use a VPN to connect to the OBUs, even if the MC/NC itself has an "exclusive" "public" IP address.

In addition, the particular MC/NC may process the "Wi-Fi authentication/SSID" category/topic of the MCF, and may extract information about the kind of network access that the end users will have. Such configuration information may indicate whether one or several SSIDs involve traffic forwarding through a specific VLAN. Such information may also indicate whether the end users are to be authenticated in a private "captive portal." Configuration information for the MC/NC in the MCF may also indicate whether the end users are to have access to a private network and/or private DHCP assignment and that the end user traffic is to be forwarded at "level 2" (L2) to the client's premises, which may also signal to the MC/NC that the MC/NC is to insure this type of communication between each OBU and one or a set of interfaces/VLANs. If this is not the case, then the end user traffic may be forwarded at "level 3" (L3) and the MC/NC may use Network Address Translation (NAT) and forward the end user traffic to a gateway that may be defined in the MCF configuration information for the MC/NC.

An MC/NC in accordance with various aspects of the present disclosure may extract, from the configuration information in the "Network" category/topic of the MCF (e.g., MCF 900), configuration information that identifies a VLAN through which the MC/NC is to communicate with FAPs and, in a situation in which foreign FAPs are indicated as enabled, the MC/NC may also configure a VPN for connecting to those foreign FAPs. In addition, the MC/NC may also extract configuration information that indicates whether use of SNMP is to be enabled.

In accordance with various aspects of the present disclosure, Fixed Access Points (FAPs) may process the "Network" category/topic of the MCF and may extract network configuration information such as, for example, a VLAN ID, a predefined IP address assignment, or an indication that DHCP is to be used. If an FAP (i.e., RSU) is connected through a foreign network, the FAP may establish a VPN to each one of the MCs/NCs in the example network of moving things as described herein. The configuration information for the "Network" category/topic of the MCF may also identify whether SNMP is to be enabled for the FAP.

In accordance with various aspects of the present disclosure, a particular Mobile AP (MAP) may, for example, process the "Cellular" category/topic of the MCF and may extract configuration information for that MAP that identifies, for example, whether communication with the MC/NC is to be direct (i.e., when both have "public" IP addresses) or through a VPN.

In addition, that same MAP may, for example, extract from the "Wi-Fi Authentication/SSID" category/topic of the MCF, configuration information for that MAP that identifies the configuration of each SSID to be broadcast by the MAP, and the type of traffic forwarding to be performed to each SSID (e.g., L2 or L3) and may configure the applications to act accordingly.

The MCF in a network of moving things in accordance with aspects of the present disclosure may be kept/located in an easily reachable location (e.g., a public server on the Cloud 860 of FIG. 8) from which the various network entities of the network of moving things can access the MCF. In some instances, FAPs/RSUs and MCs/NCs may access the MCF via a gateway, the IP address of which may be provided through DHCP on the client network, while OBUs/MAPs may access the MCF directly via a cellular data connection. In some situations, the MCF may also be shared between network entities using an advertisement/request mechanism such as, for example, the mechanism depicted in the example of FIG. 10, discussed below.

Figure 10:
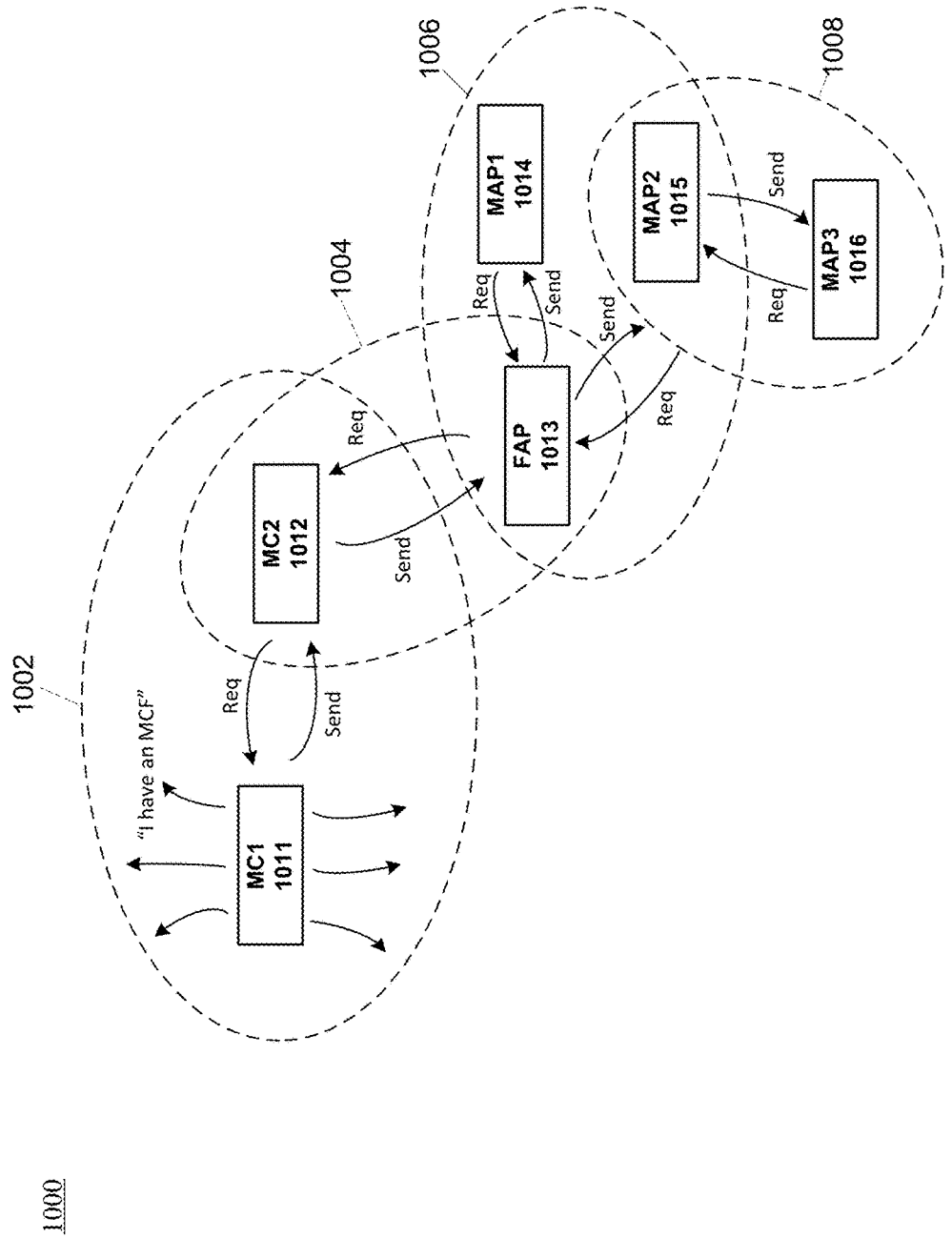
FIG. 10 is an illustration showing the sharing of a Master Configuration File (MCF) by various network entities of an example network of moving things, in accordance with various aspects of the present disclosure.

FIG. 10 is an illustration showing the sharing of a Master Configuration File (MCF) by various network entities of an example network of moving things 1000, in accordance with various aspects of the present disclosure. The network of moving things 1000 shown in FIG. 10 includes mobility controllers/network controllers MC1 1011 and MC2 1012, a fixed access point FAP 1013, and mobile access points MAP1 1014, MAP2 1015, and MAP3 1016. In accordance with various aspects of the present disclosure, an MCF need only be implanted in one network entity (e.g., MC1 1011) to have the MCF propagate to every other network entity. This is illustrated in the example of FIG. 10, for example, in the propagation of an MCF from MC1 1011 to MC2 1012, shown as the message exchange 1002, the further propagation of the MCF from MC2 1012 to FAP 1013, shown as the message exchange 1004, the propagation of the MCF from FAP 1013 to MAP1 1014 and/or MAP2 1015, shown in message exchanges 1006, and possible propagation of the MCF between MAP2 1015 and MAP3 1016, as illustrated in the message exchange 1008.

In accordance with various aspects of the present disclosure, the sharing of an MCF between a network entity "A" and a network entity "B" involves network entity "A" broadcasting an announcement (i.e., an "advertisement") indicating that network entity "A" has an MCF available for sharing. Network entity "B," upon receiving this announcement/advertisement may then send a request to network entity "A," asking that the MCF be shared with network entity "B." Upon receiving the request from network entity "B," network entity "A" then sends the MCF to network entity "B," which may then process the MCF as described above, and may also then start to "advertise" that it, network entity "B," has the MCF available for sharing. To reduce the number of advertisements in a given network, network entities of a network of moving things in accordance with various aspects of the present disclosure may not advertise the MCF in the network (e.g., a wired network, or a wireless IEEE 8021.11 a/b/g/n/ac, Bluetooth, etc.) in which the network entity is receiving advertisements from other network entities. That is, in accordance with aspects of the present disclosure, a FAP listening to advertisements of MCF availability in a first wired or wireless network may only advertise the availability of the MCF on one or more other wired or wireless networks separate from the first network.

In a network of moving things in accordance with various aspects of the present disclosure, each network element that is part of the resulting network solution may be effectively deployed without having all of the entities of the network up and running at the same time, thereby avoiding delivery, configuration, and maintenance delays and costs. In accordance with aspects of the present disclosure, the deployed network entities wait for an MCF to be made available to them (e.g., via "advertisement" or "notification"), and each network entity then generates its own configuration information from the received MCF, enabling each entity to run the applications of the network entity and communicate with other network elements and the client network in the manner desired by the operators of the network or moving things, and the client(s). In this manner, a network of moving things according to the present disclosure provides a solution that is tailored to accommodate delays in the deployment, installation, and configuration of each network entity. Such a network also provides a flexible and programmable way to install and configure networks and elements based on the requirements of different clients, in a manner that is client/partner agnostic. Further, coordination among the different persons/organizations responsible for the installation and configuration of each part of the network solution (e.g., operations, accounting, IT, general management, etc.) is facilitated by using approach described herein.

By employing the approach described herein, the individuals or organizations responsible for the installation of each network entity (e.g., MAPs/OBUs, FAPs/RSUs, or MCs/NCs, sensors, etc.), whether they are part of the client organization, the provider of any of the network entities of the network of moving things, or a sub-contractor, may proceed to install their portion without waiting for the installation and proper configuration of the remaining elements that are part of the network solution. An approach such as that described herein alleviates delays and costs of dealing with different public or private companies involved in the installation of a network solution, and in some instance may be considered crucial as projects often involve tens or hundreds of network entities, making it difficult if not impossible to get all parts of the solution ready at the same time. A network of moving things in accordance with various aspects of the present disclosure offers a unique solution that is flexible enough to be adapted to different client/end user requirements, without losing robustness. Further, such a network provides sufficient and sustained support to be able to be compliant with numerous internal systems that clients may have.

In a network of moving things in accordance with aspects of the present disclosure, the MCF availability and distribution protocol may be used to advertise the availability of updates to the MCF, and therefore advertise the network configuration. This may permit a network reset to add additional features, or to correct a misconfiguration of the MCF. In accordance with various aspects of the present disclosure, a time base control may be used to control the sharing of the MCF within a given period of time such as, for example, a day, but may enable application of the MCF only after a given defined time, e.g., at midnight, in order to minimize any network disruptions.

Various aspects of the present disclosure may be seen in a communication system comprising: a plurality of nodes operable in a communication network. The plurality of nodes may comprise a first node operable in a first network and a second network, where the first node may be configured to receive, via the first network, a set of configuration information comprising one or more configuration parameters for corresponding nodes of the plurality of nodes of the communication network. The first node may also be configured to propagate the set of configuration information from the first node to the second node via the second network, and apply, to the first node, those configuration parameters of the set of configuration information corresponding to the first node, to establish operation of the first node according to the configuration parameters corresponding to the first node. The plurality of nodes may comprise a second node operable in at least the second network, where the second node may be configured to receive, from the first node via the second network, the set of configuration information, and apply, to the second node, those configuration parameters of the set of configuration information corresponding to the second node, to establish operation of the second node according to the configuration parameters corresponding to the second node.

In accordance with various aspects of the present disclosure, the set of configuration information may comprise one or more configuration parameters for operating respective nodes of the plurality of nodes of a configuration of the communication system corresponding to a particular user of the communication system. The one or more configuration parameters may comprise one of a virtual private network identifier, a wireless network service set identifier, a radio frequency channel, or an indicator of a type of authentication, and the one or more configuration parameters may comprise an indicator of a communication methodology to be used to propagate information between nodes of the plurality of nodes. The second node may be operable in a third network different from the first network and the second network, and the second node may be configured to propagate the set of configuration information from the second node to a third node via the third network. To propagate the set of configuration information, the first node may be configured to advertise the availability of the set of configuration information from the first node to one or more neighboring nodes of the first node, via the second network; receive a request for the set of configuration information from the one or more neighboring nodes, via the second network; and responsive to the request, send the set of configuration information from the first node to the one or more neighboring nodes via the second network. The location of operation of the first node and the location of operation of the second node may change over time, and communication via the first network and the second network may use different communications protocols.

Further aspects of the present disclosure may be found in a communication system comprising a plurality of nodes, where each particular node of the plurality of nodes may be operable on one or more communication networks of the communication system and may be configured to receive a set of configuration information for the plurality of nodes at the particular node of the plurality of nodes via the one or more communication networks; and to propagate the set of configuration information to available nodes of the plurality of nodes that are neighbors of the particular node, via the one or more networks. Each particular node may also be configured to process configuration parameters for the particular node by applying configuration parameters corresponding to the particular node in the set of configuration information, to configure operation of the particular node with regard to use of the one or more communication networks.

The set of configuration information may comprise one or more configuration parameters for operating respective nodes of the plurality of nodes of a configuration of the communication system corresponding to a particular user of the communication system, and the one or more configuration parameters may comprise one of a virtual private network identifier, a wireless network service set identifier, a radio frequency channel, or an indicator of a type of authentication. The one or more configuration parameters may comprise an indicator of a communication methodology to be used to propagate information between nodes of the plurality of nodes using the one or more communication networks. To propagate the set of configuration information, the particular node may be configured to advertise the availability of the set of configuration information from the particular node to one or more neighboring nodes of the particular node, via the one or more communication networks; receive a request for the set of configuration information from the one or more neighboring nodes; and responsive to the request, send the set of configuration information from the particular node to the one or more neighboring nodes via the one or more communication networks. In accordance with various aspects of the present disclosure, the location of operation of the particular node may change over time, and the one or more communications networks may comprise two communications networks and communication via the two communication networks may use different communications protocols.

Additional aspects of the present disclosure may be observed in a method of operating a node of a plurality of nodes operable on one or more communication networks of a communication system. Such as method may comprise receiving a set of configuration information for the plurality of nodes at a particular node of the plurality of nodes via the one or more communication networks; propagating the set of configuration information to available nodes of the plurality of nodes that are neighbors of the particular node, via the one or more communication networks; and processing configuration parameters for the particular node by applying configuration parameters corresponding to the particular node in the set of configuration information, to configure operation of the particular node with regard to use of the one or more communication networks. The set of configuration information may comprise one or more configuration parameters for operating respective nodes of the plurality of nodes of a configuration of the communication system corresponding to a particular user of the communication system. The one or more configuration parameters may comprise one of a virtual private network identifier, a wireless network service set identifier, a radio frequency channel, or an indicator of a type of authentication, and the one or more configuration parameters may comprise an indicator of a communication methodology to be used to propagate information between nodes of the plurality of nodes using the one or more communication networks.

In accordance with aspects of the present disclosure, propagating the set of configuration information may comprise advertising the availability of the set of configuration information from the particular node to one or more neighboring nodes of the particular node, via the one or more communication networks; receiving a request for the set of configuration information from the one or more neighboring nodes; and responsive to the request, sending the set of configuration information from the particular node to the one or more neighboring nodes via the one or more communication networks. The location of operation of the particular node may change over time, and the one or more communications networks may comprise two communications networks and communication via the two communication networks may use different communications protocols.

Thus, an Internet of moving things in accordance with aspects of the present disclosure provides support for the application of updates (e.g., software, firmware, and/or data/configuration information) in a variety of device-types and hardware versions. Further, aspects of the present disclosure may be used to leverage an Internet of moving things to epidemically distribute updates at the lowest possible cost using low or zero cost communications technologies, and without the need to rely on cellular links. In accordance with various aspects of the present disclosure, a system may be configured to leverage the best available communication technology to download updates to various system components, and provides support for incremental updates as well as complete/full updates of parts of the operative system. In addition, a system in accordance with various aspects of the present disclosure provides support for geo-fenced updates and configurations.

An Internet of moving things in accordance with various aspects of the present disclosure may be used to connect different types of devices that are physically on the move and also statically deployed. Such devices may present different kinds hardware versions and expected behaviors. In order to support the evolution of products that have already been deployed, use of an update mechanism such as the one presented herein allows for new features to be installed in already deployed network units, providing higher levels of security, reliability, and functionality.

An Internet of moving things in accordance with various aspects of the present disclosure may provide a decentralized authentication mechanism for update validation, and may include a distributed update validation check. Further, such a system and network allows network units to download updates (e.g., software, firmware, and/or data/configuration information) for third-party and external network units. In addition, a system and network as described herein may support a distributed, cluster-based configuration management and decision mechanism for network units. Such a system may select the most plausible network configuration to use in any given situation. Aspects of an Internet of moving things in accordance with various aspects as described herein allow for updates to be downloaded and distributed epidemically in chunks.

As provided herein, a communication network and/or node thereof implemented in accordance with various aspects of this disclosure may increase the connectivity between nodes (e.g., between fixed and mobile APs), throughput may increase, range may increase, latency may decrease, packet loss may decrease, overall network performance may increase, etc. Additionally, data communication may be substantially more economical than with other types of networks (e.g., cellular, etc.). Further, a node (e.g., a fixed AP) implemented in accordance with various aspects of this disclosure may be installed at a location that does not have ready access to power and/or to a traditional type of backhaul. Still further, a network implemented in accordance with various aspects of this disclosure may be operated with fewer APs than would otherwise with necessary, reducing overall cost. Additionally, a network implemented in accordance with various aspects of this disclosure, for example having multiple adaptive fixed APs that are collocated, provides immense flexibility to provide differentiation of services, network redundancy, load balancing, high reliability, and dedicated services. In an example implementation, different APs at a same location or serving a same coverage area may utilize different respective channels, thus providing bandwidth allocation flexibility, for example to prioritize particular services or service classes, increasing overall spectrum utilization, etc. In utilized as the wireless backbone of the network of moving things, will enhance all that the technology has to offer.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication system comprising:
   a plurality of nodes operable in a communication network, the plurality of nodes comprising:
      a first node operable in a first network and a second network, the first node configured to:
         receive, via the first network, a set of configuration information comprising one or more configuration parameters for corresponding nodes of the plurality of nodes of the communication network,
         propagate the set of configuration information from the first node to a second node via the second network, wherein to propagate the set of configuration information, the first node is configured to:
            advertise the availability of the set of configuration information from the first node to one or more neighboring nodes of the first node, via the second network;
            receive a request for the set of configuration information from the one or more neighboring nodes, via the second network; and
            responsive to the request, send the set of configuration information from the first node to the one or more neighboring nodes via the second network, and
         apply, to the first node, those configuration parameters of the set of configuration information corresponding to the first node, to establish operation of the first node according to the configuration parameters corresponding to the first node; and
      a second node operable in at least the second network, the second node configured to:
         receive, from the first node via the second network, the set of configuration information, and
         apply, to the second node, those configuration parameters of the set of configuration information corresponding to the second node, to establish operation of the second node according to the configuration parameters corresponding to the second node.

2. The communication system according to claim 1, wherein the set of configuration information comprises one or more configuration parameters for operating respective nodes of the plurality of nodes of a configuration of the communication system corresponding to a particular user of the communication system.

3. The communication system according to claim 2, wherein the one or more configuration parameters comprise one of a virtual private network identifier, a wireless network service set identifier, a radio frequency channel, or an indicator of a type of authentication.

4. The communication system according to claim 2, wherein the one or more configuration parameters comprise an indicator of a communication methodology to be used to propagate information between nodes of the plurality of nodes.

5. The communication system according to claim 1, wherein:
   the second node is operable in a third network different from the first network and the second network; and
   the second node is configured to propagate the set of configuration information from the second node to a third node via the third network.

6. The communication system according to claim 1, wherein the location of operation of the first node and the location of operation of the second node change over time.

7. The communication system according to claim 1, wherein communication via the first network and the second network uses different communications protocols.

8. A communication system comprising:
   a plurality of nodes, each particular node of the plurality of nodes operable on one or more communication networks of the communication system and configured to:
      receive a set of configuration information for the plurality of nodes at a particular node of the plurality of nodes via the one or more communication networks;
      propagate the set of configuration information to available nodes of the plurality of nodes that are neighbors of the particular node, via the one or more networks, wherein to propagate the set of configuration information, the particular node is configured to:
         advertise the availability of the set of configuration information from the particular node to one or more neighboring nodes of the particular node, via the one or more communication networks,
         receive a request for the set of configuration information from the one or more neighboring nodes, and
         responsive to the request, send the set of configuration information from the particular node to the one or more neighboring nodes via the one or more communication networks; and
      process configuration parameters for the particular node by applying configuration parameters corresponding to the particular node in the set of configuration information, to configure operation of the particular node with regard to use of the one or more communication networks.

9. The communication system according to claim 8, wherein the set of configuration information comprises one or more configuration parameters for operating respective nodes of the plurality of nodes of a configuration of the communication system corresponding to a particular user of the communication system.

10. The communication system according to claim 9, wherein the one or more configuration parameters comprise one of a virtual private network identifier, a wireless network service set identifier, a radio frequency channel, or an indicator of a type of authentication.

11. The communication system according to claim 9, wherein the one or more configuration parameters comprise an indicator of a communication methodology to be used to propagate information between nodes of the plurality of nodes using the one or more communication networks.

12. The communication system according to claim 8, wherein the location of operation of the particular node changes over time.

13. The communication system according to claim 8, wherein the one or more communications networks comprise two communications networks and communication via the two communication networks uses different communications protocols.

14. A method of operating a node of a plurality of nodes operable on one or more communication networks of a communication system, the method comprising:
  receiving a set of configuration information for the plurality of nodes at a particular node of the plurality of nodes via the one or more communication networks;
  propagating the set of configuration information to available nodes of the plurality of nodes that are neighbors of the particular node, via the one or more communication networks, wherein propagating the set of configuration information comprises:
    advertising the availability of the set of configuration information from the particular node to one or more neighboring nodes of the particular node, via the one or more communication networks,
    receiving a request for the set of configuration information from the one or more neighboring nodes, and
    responsive to the request, sending the set of configuration information from the particular node to the one or more neighboring nodes via the one or more communication networks; and
  processing configuration parameters for the particular node by applying configuration parameters corresponding to the particular node in the set of configuration information, to configure operation of the particular node with regard to use of the one or more communication networks.

15. The method according to claim 14, wherein the set of configuration information comprises one or more configuration parameters for operating respective nodes of the plurality of nodes of a configuration of the communication system corresponding to a particular user of the communication system.

16. The method according to claim 15, wherein the one or more configuration parameters comprise one of a virtual private network identifier, a wireless network service set identifier, a radio frequency channel, or an indicator of a type of authentication.

17. The method according to claim 15, wherein the one or more configuration parameters comprise an indicator of a communication methodology to be used to propagate information between nodes of the plurality of nodes using the one or more communication networks.

18. The method according to claim 14, wherein the location of operation of the particular node changes over time.

19. The method according to claim 14, wherein the one or more communications networks comprise two communications networks and communication via the two communication networks uses different communications protocols.

* * * * *

UNITED STATES PATENT AND TRADEMARK OFFICE
CERTIFICATE OF CORRECTION

PATENT NO. : 9,743,451 B2  
APPLICATION NO. : 15/132867  
DATED : August 22, 2017  
INVENTOR(S) : Diogo Lopes et al.

Page 1 of 1

It is certified that error appears in the above-identified patent and that said Letters Patent is hereby corrected as shown below:

On the Title Page

Please correct the priority data as follows:

--Related U.S. Application Data  
(60) Provisional application No. 62/221,997, filed on Sep. 22, 2015, provisional application No. 62/222,192, filed Sep. 22, 2015, provisional application No. 62/299,269, filed Feb. 24, 2016.--

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*